3,801,561
DERIVATIVES OF SALMON THYROCALCITONIN
Stephan Guttmann, Allschwil, and Janos Pless and Heinz Bossert, Basel, Switzerland, assignors to Sandoz Ltd., Basel, Switzerland
No Drawing. Filed Oct. 27, 1971, Ser. No. 193,166
Claims priority, application Switzerland, Oct. 29, 1970, 15,992/70; Dec. 7, 1970, 18,706/70; July 5, 1971, 9,826/71, 9,827/71
Int. Cl. C07c *103/52;* C07g *7/00*
U.S. Cl. 260—12.5                                   3 Claims

ABSTRACT OF THE DISCLOSURE

The invention concerns novel polypeptides of the formula:

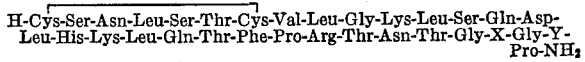
H-Cys-Ser-Asn-Leu-Ser-Thr-Cys-Val-Leu-Gly-Lys-Leu-Ser-Gln-Asp-Leu-His-Lys-Leu-Gln-Thr-Phe-Pro-Arg-Thr-Asn-Thr-Gly-X-Gly-Y-Pro-NH₂ wherein

X is valyl and
Y is alanyl, or
X is alanyl and
Y is valyl, and pharmaceutically acceptable acid addition salts and metal complexes thereof.

The compounds are useful in lowering the calcium level of plasma.

---

The present invention relates to novel polypeptides.
In accordance with the invention there are provided new polypeptides of General Formula I,

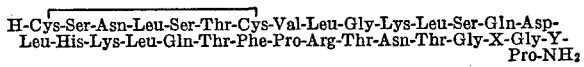
H-Cys-Ser-Asn-Leu-Ser-Thr-Cys-Val-Leu-Gly-Lys-Leu-Ser-Gln-Asp-Leu-His-Lys-Leu-Gln-Thr-Phe-Pro-Arg-Thr-Asn-Thr-Gly-X-Gly-Y-Pro-NH₂ wherein

X is valyl and
Y is alanyl, or
X is alanyl and
Y is valyl, and pharmaceutically acceptable acid addition salts and metal complexes thereof.

The invention also provides a process for the production of a compound of General Formula I, which comprises associating peptide units by amide linkage to form the peptide sequence of General Formula I, and splitting off any protective groups in the resulting molecule, and when desired, converting the resulting compound into an acid addition salt or metal complex form.

Preferably one of the peptide units comprises the group of Formula II,

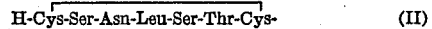
H-Cys-Ser-Asn-Leu-Ser-Thr-Cys-       (II)

wherein an S—S bridge exists between two L-cysteinyl radicals.

Conveniently, the process comprises associating by amide linkage the peptide unit of Formula III,

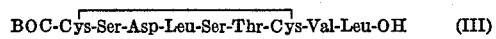
BOC-Cys-Ser-Asp-Leu-Ser-Thr-Cys-Val-Leu-OH     (III)

and the peptide unit of Formula IV,
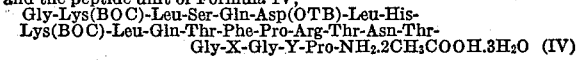
Gly-Lys(BOC)-Leu-Ser-Gln-Asp(OTB)-Leu-His-Lys(BOC)-Leu-Gln-Thr-Phe-Pro-Arg-Thr-Asn-Thr-Gly-X-Gly-Y-Pro-NH₂·2CH₃COOH·3H₂O    (IV)

wherein BOC, OTB, X and Y are as herein defined, and splitting off the protective groups in the resulting molecule.

It is to be understood that the expression "peptide unit" includes within its meaning a single amino acid, and a plurality of amino acids joined by amide linkage in the form of a peptide.

The polypeptides of the above formulae may be prepared by methods for the synthesis of compounds of this type in actual use or described in the literature on the subject, whereby the amino acids are joined in the order indicated in the above formulae one at a time or after the formation of smaller peptide units, and the disulfide bridge is formed at an appropriate stage of the synthesis. The connection of the amino acids and/or peptide units may, for example, be effected by reacting an amino acid having a protected α amino group and an activated terminal carboxyl radical with an amino acid or a peptide having a free α amino group and a free or protected terminal carboxyl radical, or by reacting an amino acid or a peptide having an activated α amino group and a protected terminal carboxyl radical with an amino acid or a peptide having a free terminal carboxyl radical and a protected α amino group.

The carboxyl radical may, for example, be activated by conversion into an acid azide, anhydride, imidazolide, isoxazolide or an activated ester, or by reaction with a carbodiimide or with N,N'-carbonyl diimidazole. The preferred condensation methods are the carbodiimide method, the azide method, the method of the activated esters, the anhydride method, and the Merrifield method.

However, in the last stage of the condensation it is convenient to employ a method avoiding or minimizing racemization, preferably by using the azide or the activated ester method, whereby activation is conveniently effected with N-hydroxysuccinimide.

The free, functional groups which do not participate in the reaction may be protected during the building up of the peptides of the invention by the usual protective groups employed in the synthesis of long-chained peptides.

With reference to partial sequences C₅ and C₆, described hereinafter, a suitable radical for blocking the guanido radical of the arginine radical is the carbobenzyloxy radical, but other suitable protective radicals, such as the nitro radical, the tosyl radical, the p-nitrobenzyloxycarbonyl radical or the 2-(isopropyloxycarbonyl)-3,4,5,6-tetrachlorobenzoyl radical, may likewise be used. It is also possible to use the protective effect of the protonization of the guanido radical during the synthesis.

With reference to partial sequences D₁ and D₂, described hereinafter, a suitable radical for blocking the ε amino radical of the lysine radical is a carbo-tert.alkyloxy radical, preferably the carbo-tert.butyloxy radical.

With reference to partial sequence F₁, described hereinafter, a suitable radical for blocking the β carboxyl radical is the tert.butyloxy radical, but other protective radicals, such as the methyloxy, the ethyloxy, the tert.amyloxy, the amide or the benzyloxy radical, may likewise be used.

The conversion of a protected amino radical into a free radical, as well as the conversion of a functionally modified carboxyl radical into a free carboxyl radical during the course of the process for the production of the new polypeptides, is effected in manner known per se by treatment with hydrolyzing or reducing agents.

The starting materials for producing the new polypeptides, insofar as they were hitherto unknown, may be obtained by methods for the synthesis of peptides in actual use or described in the literature, whereby the amino acids may be joined one at a time or after the formation of smaller peptide units.

The new polypeptides of Formula I and their pharmaceutically acceptable acid addition salts and metal complexes are useful because they possess pharmacological activity in animals. More particularly they are useful in lowering the content of calcium in the plasma, as indicated by standard biological tests in rats [J. Endocrin. 33, 469–475 (1965)]. An assay of activity in the lowering of calcium content in rat plasma indicates a value of 3000 to 6000 MRC units per mg. of peptide.

For the above mentioned use the dosage administered will of course vary depending on the activity of the compound, the mode of administration and the particular treatment desired. However, in general, satisfactory results are obtained at doses between 1 and 10 MRC units per kg. animal body weight. For larger mammals the indicated daily dose is between 70 and 700 MRC units, which may be administered parenterally in single or divided doses. A unit dosage form suitable for intramuscular administration contains between 70 and 700 MRC units of active agent, in association with a liquid pharmaceutically acceptable diluent or carrier.

The polypeptides of Formula I may be administered in pharmaceutically acceptable acid addition salt form or metal complex form. Examples of suitable salt forms include salts with organic acids, such as acetic, lactic, succinic, benzoic, salicylic, methanesulphonic and toluenesulphonic acids, with polymeric acids, such as tannic acid and carboxymethylcellulose, and with inorganic acids, such as hydrohalic acids, e.g. hydrochloric acid, and sulphuric and phosphoric acids. Examples of such metal complexes are complexes formed with calcium, magnesium, aluminium, cobalt and, especially, zinc.

The following abbreviations are use in this specification:

Z=carbobenzyl (benzyloxycarbonyl)
Bzl=benzyl
BOC=tert.butyloxycarbonyl
Trt=trityl-triphenylmethyl
OTB=tert.butyloxy
ONP=p-nitrophenyloxy
OCP=2,4,5-trichlorophenyloxy
OMe=methoxy
OEt=ethoxy
$NO_2$=nitro
Ser=L-seryl
Asn=L-asparaginyl
Asp=L-aspartyl
Leu=L-leucyl
Thr=L-threonyl
Val=L-valyl
Arg=L-arginyl
Gln=L-glutaminyl
His=L-histidyl
Pro=L-prolyl
Gly=glycyl
Lys=L-lysyl
Phe=L-phenylalanyl
Cys=L-cysteinyl
Ala=L-alanyl
OSu=N-oxysuccinimide
t.But=tert.butyl In the following non-limitative examples all temperatures are indicated in degrees centigrade. The value c for the optical rotation amounts to 1. Amino acid analysis in the folowing examples indicates that the single amino acids are present at the expected ratios.

(1) PRODUCTION OF THE STARTING MATERIAL

Partial sequence $A_1$:H-Val-Gly-Ala-Pro-$NH_2$ 27.5 g. of Z-Val-Gly-Ala-Pro-$NH_2$ are suspended in 550 cc. of methanol, and after the addition of 3 cc. of 96% sulphuric acid hydrogenation is effected in the presence of 4.1 cc. of glacial acetic acid and 3.1 g. of palladium charcoal (10%). After filtration and concentration of the solution by evaporation the product (sulphate) shows an R$f_5$ of 0.2 in the thin layer chromatogram on silica gel.

Partial sequence $A_2$: H-Ala-Gly-Val-Pro-$NH_2$ (a) Z-Val-Pro-$NH_2$: 75 g. of H-Pro-$NH_2$ are dissolved in 850 cc. of dimethyl formamide, 312 g. of Z-Val-OCP are added, and the solution is subsequently allowed to stand at room temperature for 16 hours. After concentrating the solution by evaporation in a vacuum the residue is recrystallized from ethyl acetate. Z-Val-Pro-$NH_2$, having a M.P. of 130–131°, $[\alpha]_D^{20}$=—41° in dimethyl formamide, is obtained.

(b) Z-Gly-Val-Pro-$NH_2$: 190 g. of Z-Val-Pro-$NH_2$ are dissolved in 2200 cc. of methanol, 85 cc. of 6 N hydrochloric acid in methanol are added, hydrogenation is effected in the presence of palladium charcoal at 20° and normal pressure, and the catalyst is subsequently filtered off. The product is precipitated with ether, washed and subsequently dried. 120 g. of the resulting H-Val-Pro-$NH_2$.HCl (decomposition point 217–218°, $[\alpha]_D^{20}$=—57° in methanol) are suspended in 1800 cc. of dimethyl formamide, 196 g. of Z-Gly-OCP are added, and subsequently 67 cc. of triethylamine are added, and the mixture is shaken at 20° for 17 hours. The precipitated triethylamine hydrochloride is filtered off, and the filtrate is concentrated by evaporation in a vacuum. The residue is dissolved in a mixture of ethyl acetate and water. After drying over sodium sulphate and concentrating by evaporation, Z-Gly-Val-Pro-$NH_2$, having a M.P. of 82° (decomp.), $[\alpha]_D^{20}$=—76° in methanol, is obtained.

(c) Z-Ala-Gly-Val-Pro-$NH_2$: 92 g. of

Z-Gly-Val-Pro-$NH_2$ are dissolved in 2000 cc. of methanol, 27 cc. of acetic acid are added, and hydrogenation is effected at 20° in the presence of palladium charcoal at normal pressure. Filtration is effected, the filtrate is evaporated to dryness in a vacuum, the residue is dissolved in 1000 cc. of dimethyl formamide, 100 g. of Z-Ala-OCP are added, shaking is effected, and the solution is allowed to stand at 20° for 17 hours. The reaction solution is subsequently evaporated to dryness in a vacuum, and the residue is crystallized from ethyl acetate/ether.

Z-Ala-Gly-Val-Pro-$NH_2$, having a M.P. of 80° (decomp.), $[\alpha]_D^{20}$=—31° in dimethyl formamide, is obtained.

(d) H-Ala-Gly-Val-Pro-$NH_2$: 27.5 g. of

Z-Ala-Gly-Val-Pro-$NH_2$ are suspended in 550 cc. of methanol, and after the addition of 3 cc. of 96% sulphuric acid hydrogenation is effected in the presence of 4.1 cc. of glacial acetic acid and 3.1 g. of palladium charcoal (10%). After filtration and concentration of the solution by evaporation the product (sulphate) shows an R$f_5$ of 0.4 in the thin layer chromatogram on silica gel. System: chloroform/methanol 7.3+0.5% of water.

Partial sequence $B_1$: Z-Thr-Asn-Thr-Gly-NHNH$_2$ 98 g. of Z-Thr-Asn-Thr-Gly-OEt are dissolved in 1000 cc. of dimethyl formamide, and 100 cc. of hydrazine hydrate are added. After allowing to stand at room temperature for 16 hours the reaction mixture is filtered off and washed with water and ether. The title compound, having a M.P. of 221°, $[\alpha]_D^{20}$=—9° in dimethyl formamide, is obtained.

Partial sequence $C_1$:
H-Arg-Thr-Asn-Thr-Gly-Val-Gly-Ala-Pro-$NH_2$ 13.5 g. of BOC-Arg-Thr-Asn-Thr-Gly-NHNH$_2$ are dissolved in 270 cc. of dimethyl formamide/water (8:2), the solution is cooled to —15°, 40 cc. of a 4 N solution of hydrochloric acid in dioxane and 2.5 cc. of tert.butyl nitrite are added. Stirring is effected at —15° for 10 minutes, 28 cc. of triethylamine are added, the reaction mixture is filtered off, 10.5 g. of H-Val-Gly-Ala-Pro-$NH_2$ (partial sequence $A_1$) are added, and stirring is effected at 0° for 16 hours. The reaction mixture is subsequently evaporated to dryness, the residue is washed with ether and dried. The residue is dissolved in methanol, one tenth by volume of water and a seven-fold quantity of chloroform are added, and the resulting solution is allowed to pass through a column of 500 g. of silica gel. After elution with an increasing amount of methanol and concentration by evaporation, BOC-Arg-Thr-Asn-Thr-Gly-Val-Gly-Ala-Pro-NH$_2$ is obtained. This is suspended in 200 cc. of a 4 N solution of hydrochloric acid in dioxane, and stirring is effected at 25° for 2 hours. The reaction solution is evaporated to dryness, the residue is dissolved in 0.2 N acetic acid, treatment is effected with Amberlite IRA 410 (acetate form), and the aqueous solution is lyophilized. The residue is subsequently washed with ether, ethyl acetate and again with ether, and drying is effected over sodium hydroxide shavings. The title compound is obtained in the form of the diacetate, having a M.P. of 195° (decomp.), $[\alpha]_D^{20} = -64°$ in dimethyl formamide/1 N hydrochloric acid (1:1).

Partial sequence C$_2$:
H-Arg-Thr-Asn-Thr-Gly-Ala-Val-Pro-NH$_2$

The title compound is obtained in the form of the diacetate, having a M.P. of 155° (decomp.), $[\alpha]_D^{20} = -38°$ in dimethyl formamide, by a process analogous to that indicated in partial sequence C$_1$, from BOC-Arg-Thr-Asn-Thr-Gly-NHNH$_2$ and H-Ala-Gly-Val-Pro-NH$_2$ (partial sequence A$_2$).

Partial sequence C$_3$:
Z-Thr-Asn-Thr-Gly-Val-Gly-Ala-Pro-NH$_2$ 47 cc. of a 1.85 N solution of hydrochloric acid in dioxane and 2.2 cc. of tert.butyl nitrite are added to a solution cooled to −15° of 11 g. of Z-Thr-Asn-Thr-Gly-NHNH$_2$ (partial sequence B$_1$) in 350 cc. of dimethyl formamide. The solution is stirred at −15° for 10 minutes, is cooled to −30°, 12 cc. of triethylamine are added, and the mixture is filtered into a cold solution of H-Val-Gly-Ala-Pro-NH$_2$ (partial sequence A$_1$) in dimethyl formamide. After stirring at 0° for 90 minutes the solution is concentrated by evaporation in a vacuum, chloroform is added, and the precipitated material is filtered off and dried. A solution of this crude product in water/methanol is filtered through Dowex 50, is rendered neutral with Amberlite IRA 410 and subsequently concentrated by evaporation in a vacuum. The residue is triturated in acetonitrile, heated, filtered and dried. The title compound, having a M.P. for 220° (decomp.), $[\alpha]_D^{20} = -28°$ in dimethyl formamide, is obtained.

Partial sequence C$_4$:Z-Thr-Asn-Thr-Gly-Ala-Gly-Val-Pro-NH$_2$

The title compound, having a M.P. 206° (decomp.), $[\alpha]_D^{20} = -25°$ in dimethyl formamide, is obtained in a manner analogous to that described in partial sequence C$_3$ from Z-Thr-Asn-Thr-Gly-NHNH$_2$ (partial sequence B$_1$) and H-Ala-Gly-Val-Pro-NH$_2$ (partial sequence A$_2$).

Partial sequence C:Z$_3$-Arg-Thr-Asn-Thr-Gly-Val-Gly-Ala-Pro-NH$_2$ 10 g. of Z-Thr-Asn-Thr-Gly-Val-Gly-Ala-Pro-NH$_2$ (partial sequence C$_3$) are dissolved in 800 cc. of methanol/water, 0.5 g. of palladium charcoal are added, and hydrogenation is effected at normal pressure. The catalyst is filtered off, and the filtrate is concentrated by evaporation in a vacuum. The resulting oil, H-Thr-Asn-Thr-Gly-Val-Gly-Ala-Pro-NH$_2$, is dissolved in 100 cc. of dimethyl formamide, 10 g. of Z$_3$-Arg-OSu are added, and the mixture is allowed to stand at 20° for 16 hours. The solution is then concentrated by evaporation in a vacuum, the product is precipitated with acetone and filtered off. The residue is finely suspended in acetone, boiled, filtered and dried. The title compound, having a M.P. of 201° (decomp.), $[\alpha]_D^{20} = -15°$ in dimethyl formamide, is obtained.

Partial sequence C$_6$:Z$_3$-Arg-Thr-Asn-Thr-Gly-Ala-Gly-Val-Pro-NH$_2$

The title compound, having a M.P. of 185° (decomp.), $[\alpha]_D^{20} = -14°$ in dimethyl formamide, is obtained in a manner analogous to that described in partial sequence C$_5$ from Z-Thr-Asn-Thr-Gly-Ala-Gly-Val-Pro-UH$_2$ (partial sequence C$_4$) and Z$_3$-Arg-OSu.

Partial sequence D$_1$:Z-His-Lys(BOC)-Leu-Gln-Thr-Phe-Pro-OH (a) H-Thr-Phe-Pro-OH: 176 g. of Z-Phe-Pro-OME are dissolved in 1000 cc. of methanol/1 N HCl, hydrogenation is effected in the presence of palladium charcoal at 20° and 1 atmosphere, and the solution is concentrated by evaporation. The residue is dissolved in 400 cc. of dimethyl formamide, 100 cc. of triethylamine are added at 0°, the triethylamine hydrochloride which crystallizes is filtered off, and Z-Thr-N$_3$ (produced from 87 g. of Z-Thr-NHNH$_2$ by dissolving in 100 cc. of 1 N hydrochloric acid, and adding 35 cc. of 1 N sodium nitrite) is added to the filtrate. The reaction solution is subsequently allowed to stand at 0° for 16 hours, is evaporated to dryness, the residue is dissolved in ethyl acetate, is successively washed with dilute hydrochloric acid and dilute ammonia, is dried and concentrated by evaporation. The residue is pulverized in heptane, washing with petroleum ether and drying are effected. Z-Thr-Phe-Pro-OMe, having a M.P. of 92° (decomp.), $[\alpha]_D^{20} = -16°$ in dimethyl formamide, is obtained.

53 g. of Z-Thr-Phe-Pro-OMe are dissolved in 530 cc. of methanol, 100 cc. of 2 N caustic soda solution are added, the solution is allowed to stand at 25° for 1 hour, 50 cc. of 2 N hydrochloric acid are added, the solution is concentrated to approximately 200 cc., 100 cc. of water are added, the pH of the solution is adjusted to 10, the aqueous solution is washed twice with ethyl acetate, the pH of the solution is adjusted to 1 with 4 N hydrochloric acid, the precipitated tripeptide Z-Thr-Phe-Pro-OH is extracted with ethyl acetate, is dried and concentrated by evaporation. M.P. 105°, $[\alpha]_D^{20} = -28°$ in dimethyl formamide. The residue is dissolved in a mixture of 500 cc. of dioxane and 100 cc. of water, and hydrogenation is effected at 20° and normal pressure in the presence of a palladium catalyst. Filtration is effected, the filtrate is evaporated to dryness, the residue is washed with ether and dried. H-Thr-Phe-Pro-OH, having a M.P. of 192° (decomp.), $[\alpha]_D^{20} = -41°$ in 95% acetic acid, is obtained.

(b) Z-His-Lys(BOC)-Leu-Glyn-Thr-Phe-Pro-OH: 40 g. of Z-His-Lys(BOC)-Leu-Gln-NHNH$_2$ are dissolved in 400 cc. of dimethyl formamide, the solution is cooled to −20°, 75 cc. of dioxane/ 2 N HCl are added, and subsequently 6 cc. of tert.butyl nitrite are added, the mixture is stirred at −20° for 10 minutes, 30 cc. of triethylamine and 20 g. of H-Thr-Phe-Pro-OH are added, and the mixture is allowed to react 25° for 16 hours. The reaction solution is subsequently evaporated to dryness, the residue is washed with ether, dilute acetic acid, ether, and finally with hot ethyl acetate. The reaction mixture is subsequently dried in a high vacuum, whereby Z-His-Lys(BOC)-Leu-Gln-Thr-Phe-Pro-OH, having a M.P. of 200° (decomp.), $[\alpha]_D = -47°$ in dimethyl formamide, is obtained.

Partial sequence $D_2$: Z-His-Lys(BOC)-Leu-Gln-Thr-Phe-Pro-NHNH$_2$ (a) Z-Gln-Thr-Phe-Pro-OMe: 84.8 g. of Z-Thr(t.But)-OMe are dissolved in 1500 cc. of methanol, and 125 cc. of 2 N hydrochloric acid and 10 g. of palladium (10% on charcoal) are added. After hydrogenation for 4 hours the catalyst is filtered off, and the filtrate is completely concentrated by evaporation.

61.2 g. of Z-Gn-OH and 25.6 g. of N-hydroxysuccinimide are dissolved in 1000 cc. of acetonitrile/dimethyl formamide, and the solution is cooled to −15°. A solution of 45.7 g. of dicyclohexyl carbodiimide in 200 cc. of acetonitrile is first flushed into the reaction solution, and then the HCl.H-Thr(t.But)-OMe obtained above, dissolved in dimethyl formamide, with the addition of 30.4 cc. of triethylamine. The reaction mixture is allowed to stand at room temperature for approximately 16 hours with occasional shaking. The triethylamine hydrochloride or dicyclohexyl urea which crystallizes is filtered off, and the filtrate is completely concentrated by evaporation. The residue is taken up in ethyl acetate and washed with 1 N hydrochloric acid and 5% sodium bicarbonate. After drying over sodium sulphate the organic phase is concentrated to a volume of approximately 200 cc., and petroleum ether is added thereto. The resulting oil is transformed into a powder and filtered off. Z-Gln-Thr(t.But)-OMe, having a M.P. of 106°, $[\alpha]_D^{20}= +11°$ in dimethyl formamide, is obtained.

78.0 g. of Z-Gln-Thr(t.But)-OMe are dissolved in 800 cc. of methanol, and 65 cc. of hydrazine hydrate are added. The reaction solution is allowed to stand at room temperature for 48 hours, and is then completely concentrated by evaporation. The residue is treated with water and subsequently recrystallized from methanol/water. Z-Gln-Thr(t.But)-NHNH$_2$, having a M.P. of 202°, $[\alpha]_D^{20}= -13°$ in methanol, is obtained.

45.3 g. of Z-Phe-Pro-OMe are dissolved in 750 cc. of methanol, and 55 cc. of 2 N hydrochloric acid and 12 g. of palladium (10% on charcoal) are added. After hydrogenating for 2 hours the calculated amount of hydrogen has been used up almost quantitatively. The catalyst is filtered off, and the filtrate is completely concentrated by evaporation.

49.5 g. of Z-Gln-Thr(t.But)-NHNH$_2$ are dissolved in 500 cc. of dimethyl formamide, and the solution is cooled to −20°. After the addition of 77 cc. of 5 N hydrochloric acid in ether and 13.4 cc. of tert.butyl nitrate, the reaction solution is stirred for 10 minutes and rendered neutral with 54 cc. of triethylamine. The HCl.H-Phe-Pro-OMe obtained above is dissolved in 150 cc. of dimethyl formamide, 15.4 cc. of triethylamine are added, and this mixture is flushed into the dipeptide azide. After stirring at room temperature for 4 hours the triethylamine hydrochloride which crystallizes is filtered off, and the filtrate is completely concentrated by evaporation. The residue is filtered over a silica gel column with chloroform/methanol. After crystallization from ethyl acetate/petroledm ether, Z-Gln-Thr(t.But)-Phe-Pro-OMe, having a M.P. of 110°, $[\alpha]_D^{20}= -41°$ in methanol, is obtained. The tetrapeptide is dissolved in 250 cc. of trifluoroacetic acid. After allowing to stand at room temperature for 20 minutes the solution is concentrated to half its volume, and the product is precipitated with ether. Filtration, further washing with ether and drying yields Z-Gln-Thr-Phe-Pro-OMe, having a M.P. of 154°, $[\alpha]_D^{20}= -59°$ in methanol.

(b) Z-His-Lys(BOC)-Leu-NHNH$_2$: 114 g. of

Z-Lys(BOC)-OH 48 g. of H-Leu-OMe and 69 g. of N-hydroxysuccinimide are dissolved in 600 cc. of ethyl acetate, and the solution is cooled to −20°. A solution of 65 g. of dicyclohexyl carbodiimide in 300 cc. of ethyl acetate is flushed into the above solution. The solution allowed to stand at room temperature for 16 hours with occasional shaking. The dicyclohexyl urea which crystallizes is filtered off, and the filtrate is completely concentrated by evaporation. The solid residue is treated with water. After recrystallization from ethyl acetate/petroleum ether, Z-Lys(BOC)-Leu-OMe having a M.P. of 113°, $[\alpha]_D^{20}= -18°$ in methanol, is obtained.

101.5 g. of Z-Lys(BOC)-Leu-OMe are dissolved in 1000 cc. of ethyl acetate, and a precooled solution of 40 cc. of 5 N hydrochloric acid in ether in 300 cc. of ethyl acetate is added. After the addition of 5 g. of palladium (10% on charcoal), suspended in 50 cc. of dimethyl formamide, hydrogenation is effected for 3½ hours, whereby the calculated amount of hydrogen is used up almost quantitatively. The catalyst is subsequently filtered off, and the filtrate is concentrated by evaporation.

78.7 g. of Z-His-NHNH$_2$ are dissolved in 400 cc. of dimethyl formamide, 182 cc. of 5 N hydrochloric acid in ether are added, and the solution is cooled to −10°. After the addition of 32.5 cc. of tert.-butyl nitrite the reaction solution is stirred for 10 minutes and is rendered neutral with 140 cc. of triethylamine.

The HCl.H-Lys(BOC)-Leu-OMe obtained above is dissolved in 300 cc. of dimethyl formamide, 36.4 cc. of triethylamine are added, and this mixture is flushed into the azide solution. After stirring at room temperature for 4 hours the triethylamine hydrochloride which crystallizes is filtered off, and the filtrate is completely concentrated by evaporation. An oil is obtained which is dissolved in ethyl acetate. After washing with water the organic phase is dried over sodium sulphate, filtered and concentrated by evaporation. Precipitation with petroleum ether and filtration are subsequently effected. The crude product is purified by chromatography on silica gel and elution with chloroform/methanol. Crystallization from ether/petroleum ether yields Z-His-Lys(BOC)-Leu-OMe, having a M.P. of 146°, $[\alpha]_D^{20}= -28°$ in methanol.

64.5 g. of Z-His-Lys(BOC)-Leu-OMe are dissolved in 300 cc. of methanol, and 15 cc. of hydrazine hydrate are added. After standing at room temperature for 3 days the solution is completely concentrated by evaporation. Ethyl acetate/n-butanol is added to the residue, and this is washed several times with saturated sodium chloride solution. The organic phase is evaporated to dryness, and the residue is filtered over a silica gel column with chloroform/methanol. Z-His-Lys(BOC)-Leu-NHNH$_2$, having a M.P. of 181°, $[\alpha]_D^{20}= -26°$ in methanol, is obtained.

(c) Z-His-Lys(BOC) - Leu-Gln-Thr-Phe-Pro-NHNH$_2$: 38.4 g. of Z-Gln-Thr-Phe-Pro-OMe are dissolved in 1500 cc. of methanol/dimethyl formamide. 10 g. of palladium (10% on charcoal), suspended in 50 cc. of water, are flushed into the solution. After approximately half an hour the calculated amount of hydrogen has been practically used up. The catalyst is filtered off and the filtrate concentrated by evaporation.

38.6 g. of Z-His-Lys(BOC)-Leu-NHNH$_2$ are dissolved in 250 cc. of dimethyl formamide. After cooling to −15°, 42 cc. of 5 N hydrochloric acid in ether and 7.3 cc. of tert.butyl nitrite are added. The reaction mixture is stirred for 10 minutes and is rendered neutral with 29.5 cc. of triethylamine. The H-Gln-Thr-Phe-Pro-OMe obtained above is dissolved in 250 cc. of dimethyl formamide and flushed into the peptide azide solution. After stirring at room temperature for 4 hours the precipitated triethylamine hydrochloride is filtered off, and the filtrate is completely concentrated by evaporation. The residue is taken up in ethyl acetate/n-butanol and washed with 1 N ammonia, 1 N sulphuric acid and several times with water. The organic phase is completely concentrated by evaporation, and the residue is purified over a silica gel column with chloroform/methanol/water. Z-His-Lys(BOC)-Leu-Gln-Thr-Phe-Pro-OMe, having a M.P. of 171°, $[\alpha]_D^{20}= -54°$ in methanol, is obtained.

43.6 g. of Z-His-Lys(BOC)-Leu-Gln-Thr-Phe-Pro-OMe are dissolved in 1000 cc. of methanol/dimethyl formamide, and 44 cc. of hydrazine hydrate are added. After standing at room temperature for 4 days the solution is completely concentrated by evaporation. The residue is boiled out in acetonitrile. After cooling to approximately 20°, filtration is effected. Z-His-Lys(BOC)-Leu-Gln-Thr-Phe-Pro-NHNH$_2$, having a M.P. of 175°, $[\alpha]_D^{20}=-58°$ in methanol, is obtained.

Partial sequence E$_1$: H-His-Lys(BOC)-Leu-Gln-Thr-Phe-Pro-Arg-Thr-Asn-Thr-Gly-Val-Gly-Ala-Pro-NH$_2$ Method A: 10 g. of heptapeptide (partial sequence D$_1$) are dissolved in 100 cc. of dimethyl formamide, the solution is evaporated, the residue is dissolved in 100 cc. of dimethyl formamide, 15 g. of N-hydroxysuccinimide are added, the mixture is cooled to 0°, 5 g. of dicyclohexyl carbodiimide are added, the mixture is allowed to react for 3 hours, the precipitated dicyclohexyl urea is filtered off, concentration is effected to 30 cc., and the resulting heptapeptide oxysuccinimide ester Z-His-Lys(BOC)-Leu-Gln-Thr-Phe-Pro-OSu is precipitated by the addition of ether. After washing out with ether the residue is dissolved in 100 cc. of dimethyl formamide, 10 g. of nonapeptide amide (partial sequence C$_1$) are added, and the mixture is allowed to react for 16 hours. 500 cc. of ethyl acetate are added, and filtration is effected. The residue is dissolved in dimethyl formamide, 10 cc. of acetic acid are added, and precipitation is again effected with ethyl acetate. Filtration, washing with ethyl acetate and ether and drying are effected. Z-His-Lys(BOC)-Leu-Gln-Thr-Phe-Pro-Arg - Thr - Asn - Thr - Gly - Val - Ala - Pro-NH$_2$·2AcOH, $[\alpha]_D^{20}=-24°$ in dimethyl formamide, is obtained and immediately dissolved in 80% acetic acid. 5 g. of palladium charcoal are subsequently added, and hydrogenation is effected at normal pressure and room temperature. Filtration is effected, the filtrate is evaporated to dryness in a high vacuum at 20°, and the residue is washed with ether. After drying over potassium hydroxide shavings, partial sequence E$_1$:triacetate, having a M.P. of 185° (decomp.), $[\alpha]_D^{20}=-42°$ in 1 N acetic acid, is obtained.

Method B: 12 g. of nonapeptide (partial sequence C$_5$) are dissolved in 1000 cc. of dimethyl formamide/water, 1.8 g. of palladium charcoal are added, and hydrogenation is effected at normal pressure. The catalyst is filtered off, and the filtrate is concentrated to 60 cc. in a vacuum. This solution of H-Arg-Thr-Asn-Thr-Gly-Val-Gly-Ala-Pro-NH$_2$ is kept at —20°.

21 cc. of a 1.85 N solution of hydrochloric acid in dioxane and 1.1 cc. of tert.butyl nitrite are added to a solution precooled to —15° of 10 g. of Z-His-Lys(BOC)-Leu-Gln-Thr-Phe-Pro-NHNH$_2$ (partial sequence D$_2$) in 100 cc. of dimethyl formamide. The solution is stirred at —15° for 10 minutes, is cooled to —30°, 6 cc. of triethylamine are added, and the solution is filtered to the cold solution of H-Arg-Thr-Asn-Thr-Gly-Val-Gly-Ala-Pro-NH$_2$ in dimethyl formamide. After stirring at 0° for 90 minutes the solution is concentrated by evaporation in a vacuum, chloroform is added, the precipitate is filtered off, washing with chloroform and then with ethyl acetate and drying are effected. The crude product is dissolved in a mixture of methanol/chloroform/water and placed on a silica gel column. Elution is effected, the pure fractions are combined and evaporated to dryness in a vacuum. The residue is dissolved in methanol, the product is precipitated with ethyl acetate, filtration and drying are effected. Z-His-Lys(BOC)-Leu-Gln-Thr-Phe-Pro - Arg - Asn - Thr - Gly-Val-Gly-Ala-Pro-NH$_2$, having a M.P. of 185° (decomp.), $[\alpha]_D^{20}=-29°$ in dimethyl formamide, is obtained.

3.68 g. of the resulting hexadecapeptide are dissolved in 120 cc. of dimethyl formamide/water, 3 g. of palladium (10% on charcoal), suspended in 10 cc. of water, are added, and catalytic hydrogenation is effected. After approximately 2 hours the calculated amount of hydrogen is practically used up. The catalyst is filtered off, and the filtrate is completely concentrated by evaporation, whereby partial sequence E$_1$ is obtained.

Partial sequence E$_2$: H-His-Lys(BOC)-Leu-Gln-Thr-Phe-Pro-Arg-Thr-Asn-Thr-Gly-Ala-Gly-Val-Pro-NH$_2$ Method A: Partial sequence E$_2$ is obtained as triacetate, having a M.P. of 164° (decomp.), $[\alpha]_D^{20}=-19°$ in dimethyl formamide, in a manner analogous to that described in partial sequence E$_1$ (method A) from the heptapeptide (partial sequence D$_1$) and the nonapeptide (partial sequence C$_2$).

Method B: 30 g. of nonapeptide (partial sequence C$_6$) are dissolved in 450 cc. of dimethyl formamide/water, 3 g. of palladium charcoal are added, and hydrogenation is effected at normal pressure. The catalyst is filtered off, and the filtrate is concentrated to 250 cc. in a vacuum. This solution of H-Arg-Thr-Asn-Thr-Gly-Ala-Gly-Val-Pro-NH$_2$ is kept at —20°.

52 cc. of a 1.85 N solution of hydrochloric acid in dioxane and 2.6 cc. of tert.butyl nitrite are added to a solution precooled to —15° of 24 g. of Z-His-Lys(BOC)-Leu-Gln-Thr-Phe-NHNH$_2$ (partial sequence D$_2$) in 200 cc. of dimethyl formamide. The solution is stirred at —15° for 10 minutes, is cooled to —30°, 14 cc. of triethylamine are added, and the solution is filtered into the cold solution of H-Arg-Thr-Asn-Thr-Gly-Ala-Gly-Val-Pro-NH$_2$ in dimethyl formamide. After stirring at 0° for 90 minutes the solution is concentrated in a vacuum, chloroform is added, the precipitate is filtered off, washing with chloroform and then with ethyl acetate and drying are effected. The crude product is dissolved in a mixture of methanol/chloroform/water, and the solution is placed on a silica gel column. Elution is effected, the pure fractions are combined and evaporated to dryness in a vacuum. The residue is dissolved in methanol, the product is precipitated with ethyl acetate, filtration and drying are effected. Z-His-Lys(BOC)-Leu-Gln-Thr-Phe-Pro-Arg - Thr - Asn-Thr-Gly-Ala-Gly-Val-Pro-NH$_2$, having a M.P. of 180° (decomp.), $[\alpha]_D^{20}=-30°$ in dimethyl formamide, is obtained.

6.75 g. of the resulting hexadecapeptide are dissolved in 220 cc. of methanol/water, 6 g. of palladium (10% on charcoal), suspended in 20 cc. of water, are added, and catalytic hydrogenation is effected. After approximately 2 hours the calculated amount of hydrogen is practically used up. The catalyst is filtered off, and the filtrate is completely concentrated by evaporation, whereby partial sequence E$_2$ is obtained.

Partial sequence F$_1$: Trt-Gly-Lys(BOC)-Leu-Ser-Gln-Asp(OTB)-Leu-NHNH$_2$ (a) Z-Asp(OTB)-Leu-OMe: 151 g. of Z-Asp(OTB)-OH and 54 g. of N-hydroxysuccinimide are dissolved in 700 cc. of acetonitrile, and the solution is cooled to —20°. 96.5 g. of dicyclohexyl carbodiimide, dissolved in 350 cc. of acetonitrile, are subsequently added. After allowing to stand for approximately 30 minutes the resulting dicyclohexyl urea is filtered off. 71.2 g. of H-Leu-OMe are added to the filtrate, this is subsequently allowed to stand for 4 hours and is concentrated by evaporation in a vacuum. Ethyl acetate/water is added to the solid residue. The organic phase is subsequently washed with 5% sodium bicarbonate solution, with water and with dilute sulphuric acid (pH 3), and after washing until neutral is dried over sodium sulphate and concentrated by evaporation. The residue is dissolved in chloroform containing 1% of methanol, and filtration is effected over a silica gel column (10-fold quantity). Z-Asp(OTB)-Leu-OMe, having a M.P. of 58°, $[\alpha]_D^{20}=-16°$ in dimethyl formamide, is obtained.

(b) Z-Gln-Asp(OTB)-Leu-OMe: 118 g. of Z-Asp-(OTB)-Leu-OMe are dissolved in 2000 cc. of methanol. 15 g. of 10% palladium on activated charcoal are subsequently mixed with 63 cc. of 4 N hydrochloric acid, and this is added to the solution. The entire material is subjected to hydrogenation at room temperature and normal pressure for 2 hours, whereby approximately 85% of the theoretic amount of hydrogen are used up. The catalyst is filtered off, and the filtrate is completely concentrated by evaporation, whereby H-Asp(OTB)-Leu-OMe·HCl is obtained in the form of an amorphous foam.

91.7 g. of Z-Gln-ONP and 93.8 g. of H-Asp(OTB)-Leu-OMe·HCl are dissolved in 500 cc. of dimethyl formamide, and 51 cc. of N-methylmorpholine are added. The reaction solution is allowed to stand at room temperature for 15 hours and is subsequently completely concentrated by evaporation in a vacuum. The resulting residue is treated thoroughly with water and filtered off from the water. Recrystallization is subsequently effected from methanol. Z-Gln-Asp(OTB)-Leu-OMe, having a M.P. of 189° (decomp.), $[\alpha]_D^{20}=-30°$ in dimethyl formamide, is obtained.

(c) Z-Ser-Gln-Asp(OTB)-Leu-OMe: 44.4 g. of Z-Gln-Asp(OTB)-Leu-OMe are dissolved in 1200 cc. of methanol/dimethyl formamide. 15 g. of 10% palladium on activated charcoal, mixed with 50 cc. of water, are subsequently added to the solution. After hydrogenation for approximately 2 hours the calculated amount of hydrogen is almost used up. The catalyst is filtered off, and the filtrate is concentrated by evaporation in a vacuum.

21.4 g. of Z-Ser-NHNH$_2$, dissolved in 100 cc. of dimethyl formamide, are cooled to −20°, and 50.6 cc. of 5 N hydrochloric acid in ether, and 10.3 cc. of tert.butyl nitrite are added. After stirring for 10 minutes, the pH of the solution is adjusted to 7.5 with 35.6 cc. of triethylamine, and 34.2 g. of H-Gln-Asp(OTB)-Leu-OMe, dissolved in 100 cc. of dimethyl formamide, are added. The mixture is stirred at 20° for 4 hours, the precipitated triethylamine hydrochloride is filtered off, and the filtrate is completely concentrated by evaporation. After treatment of the residue with water and subsequent crystallization from water/methanol, the crude product is purified by filtration over a silica gel column with chloroform/methanol. Z-Ser-Gln-Asp(OTB)-Leu-OMe, having a M.P. of 172°, $$[\alpha]_D^{20}=-24°$$

in dimethyl formamide, is obtained.

(d) Trt-Gly-Lys(BOC)-Leu-NHNH$_2$: 50.8 g. of Z-Lys-(BOC)-Leu-OMe are dissolved in 600 cc. of ethyl acetate, and after the addition of 25 cc. of 4 N hydrochloric acid in ether and 3 g. of palladium (10% on charcoal), catalytic hydrogenation is effected. After approximately 4 hours the calculated amount of hydrogen is almost completely used up. The catalyst is filtered off, and the filtrate is concentrated to half its volume.

33.0 g. of Trt-Gly-OH and 12.0 g. of N-hydroxysuccinimide are dissolved in 150 cc. of dimethyl formamide, and the solution is cooled to −15°. A solution of 21.6 g. of dicyclohexyl carbodiimide in 100 cc. of acetonitrile is flushed into the above-solution, and the mixture is allowed to stand at room temperature for 3 hours with occasional shaking. The dicyclohexyl urea which crystallizes is filtered off, and the filtrate is mixed with the dipeptide solution obtained from the above hydrogenation with the addition of 25 cc. of N-methylmorpholine. After allowing to stand for 16 hours the solution is completely concentrated by evaporation. The residue is taken up in ethyl acetate and treated at 0° with 1 N sulphuric acid and 5% sodium bicarbonate solution. After drying over sodium sulphate the organic phase is completely concentrated by evaporation. The resulting foam is filtered over a silica gel column with chloroform/methanol, whereby Trt-Gly-Lys(BOC)-Leu-OMe is obtained in the form of an amorphous foam, $[\alpha]_D^{20}=-10°$ in methanol.

The residue is dissolved in 300 cc. of methanol, 17 cc. of hydrazine hydrate are added, and the mixture is allowed to stand at room temperature for 16 hours. After concentrating completely by evaporation and drying in a high vacuum filtration is effected with chloroform/methanol over a silica gel column. Crystallization from chloroform/petroleum ether yields Trt-Gly-Lys(BOC)-Leu-NHNH$_2$, having a M.P. of 175°, $[\alpha]_D^{20}=-12°$ in methanol.

(e) Trt - Gly-Lys(BOC)-Leu-Ser-Gln-Asp(OTB)-Leu-NHNH$_2$: dissolved in 1 liter of methanol/dimethyl formamide, 5 g. NHNH$_2$: 26.6 g. of Z-Ser-Gln-Asp(OTB)-Leu-OMe are of palladium (10% on charcoal), suspended in 100 cc. of water, are added, and catalytic hydrogenation is effected. After 1 hour the calculated amount of hydrogen is used up. The catalyst is filtered off, and the methanol is removed by concentrating the filtrate.

29.6 g. of Trt-Gly-Lys(BOC)-Leu-NHNH$_2$ are dissolved in 150 cc. of dimethyl formamide. The solution is cooled to −20°, and 26.2 c. of 5 N hydrochloric acid in ether and 5.3 cc. of tert.butyl nitrite are added. After stirring for 10 minutes 18.5 cc. of triethylamine and the concentrated solution of H-Ser-Gln-Asp(OTB)-Leu-OMe obtained above are added. Stirring is effected at room temperature for 4 hours, the precipitated triethylamine hydrochloride is subsequently filtered off, and the filtrate is completely concentrated by evaporation. The residue is taken up in ether, reduced to a powder, and this is filtered with suction. This crude product is purified by filtration over a silica gel column with chloroform/methanol. Trt-Gly-Lys(BOC)-Leu-Ser-Gln-Asp(OTB)-Leu-OMe, having a M.P. of 217°, $[\alpha]_D^{20}=-30°$ in methanol, is obtained.

The heptapeptide is dissolved in 400 cc. of methanol, 1.4 cc. of hydrazine hydrate are added, and stirring is effected at room temperature for 48 hours. The precipitated hydrazide is filtered off, washed with ether and dried until a constant weight is obtained. M.P. 218°, $[\alpha]_D^{20}=-16°$ in dimethyl formamide.

Partial sequence G$_1$: Trt-Gly-Lys(BOC)-Leu-Ser-Gln-Asp (OTB) - Leu - His-Lys(BOC)-Leu-Gln-Thr-Phe-Pro - Arg - Thr - Asn - Thr-Gly-Val-Gly-Ala-Pro-NH$_2$·2CH$_3$COOH·3H$_2$O 2.43 g. of heptapeptide (partial sequence F$_1$) are dissolved in 30 cc. of dimethyl formamide. After cooling to −20°, 1.45 cc. of 5 N hydrochloric acid in ether and 0.252 cc. of tert.-butyl nitrite are added. The reaction mixture is stirred for a further 10 minutes and is then rendered neutral with 1.01 cc. of triethylamine. The hexadecapeptide E$_1$ is dissolved in 50 cc. of dimethyl formamide and flushed into the heptapeptide azide solution. After stirring at room temperature for 4 hours the precipitated triethylamine hydrochloride is filtered with suction, and the filtrate is completely concentrated by evaporation. The residue is dissolved whilst hot in a small amount of methanol and precipitated by the addition of ether. The crude product is chromatographed on a silica gel column and eluted with chloroform/methanol/water. The title compound, having a M.P. of 225°, $[\alpha]_D^{20}=-18°$ in dimethyl formamide, is obtained.

Partial sequence G$_2$: Trt - Gly-Lys(BOC)-Leu-Ser-Gln-Asp(OTB) - Leu - His-Lys(BOC)-Leu-Gln-Thr-Phe-Pro - Arg - Thr - Asn - Thr - Gly-Ala-Gly-Val-Pro-NH$_2$·2CH$_3$COOH·3H$_2$O The title compound is obtained in a manner analogous to that described in partial sequence G$_1$ from the heptapeptide (partial sequence F$_1$) and the hexadecapeptide (partial sequence E$_2$). M.P. 216°, $[\alpha]_D^{20}=-19°$ in dimethyl formamide.

(2) PRODUCTION OF THE FINAL COMPOUNDS

EXAMPLE 1: H-Cys-Ser-Asn-Leu-Ser-Thr-Cys-Val-Leu-Gly-Lys-Leu-Ser-Gln-Asp-Leu-His-Lys-Leu-Gln-Thr-Phe-Pro-Arg-Thr-Asn-Thr-Gly-Val-Gly-Ala-Pro-NH$_2$ 650 mg. of tricosapeptide (partial sequence G$_1$) are dissolved in 30 cc. of 60% acetic acid, and the solution is allowed to stand at room temperature for 16 hours. After the addition of water the solution is washed several times with ether. The water phase is eluted through an Amberlite IRA 410 acetate column, and the solution is subsequently completely concentrated by evaporation.

295 mg. of

BOC-Cys-Ser-Asn-Leu-Ser-Thr-Cys-Val-Leu-OH are dissolved in 10 cc. of dimethyl sulfoxide/dimethyl formamide, 131 mg. of N-hydroxysuccinimide and 59 mg. of dicyclohexyl carbodiimide are added, and after standing for 6 hours the precipitated dicyclohexyl urea is filtered of. The tricosapeptide obtained above by splitting off the protective radical is dissolved in 10 cc. of dimethyl formamide and flushed into the filtrate. After standing at room temperature for 48 hours the product is precipitated by the addition of ether, and the supernatant solution is decanted. The precipitate is dissolved in a small amount of methanol and is reduced to a powder by a further addition of ether. After filtering with suction and drying, 220 mg. of the protected crude dotriacontapeptide are dissolved in 4 cc. of a mixture of methylene chloride/trifluoroacetic acid/water. The solution is allowed to stand at room temperature for 1 hour, whereupon it is completely concentrated by evaporation. The residue is taken up in 0.2 N acetic acid and absorbed on a biogel column $P_6$ (1 x 300 cm.). Elution is effected with 0.2 N acetic acid. The combined pure fractions are concentrated by evaporation and subsequently lyophilized. The title compound, having a M.P. of 215° (decomp.), $[\alpha]_D^{20}=-75°$ in 1 N acetic acid, is obtained.

Composition of amino acids after acid hydrolysis (6 N 16 hours): Asp 3.1; Thr 3.7; Ser 2.8; Gln 1.9; Pro 2.0; Gly 2.9; Ala 1.0; Cys 1.6; Val 2.0; Leu 5.2; Phe 1.0; His 1.0; Lys 2.0; Arg 0.9.

EXAMPLE 2: H-Cys-Ser-Asn-Leu-Ser-Thr-Cys-Val-Leu-Gly-Lys-Leu-Ser-Gln-Asp-Leu-His-Lys-Leu-Gln-Thr-Phe-Pro-Arg-Thr-Asn-Thr-Gly-Val-Gly-Ala-Pro-NH$_2$ 300 mg. of tricosapeptide (partial sequence G$_2$) are dissolved in 15 cc. of 60% acetic acid, and the solution is allowed to stand at room temperature for 16 hours. After the addition of water, washing is effected several times with ether. The water phase is eluted through an Amberlite IRA 410 acetate column, and the solution is subsequently completely concentrated by evaporation.

170 mg. of

BOC-Cys-Ser-Asn-Leu-Ser-Thr-Cys-Val-Leu-OH are dissolved in 5 cc. of dimethyl sulfoxide/dimethyl formamide, 56 mg. of N-hydroxysuccinimide and 26 mg. of dicyclohexyl carbodiimide are added, and after allowing to stand for 6 hours, the precipitated dicyclohexyl urea is filtered off. The tricosapeptide obtained above by splitting off the protetcive radical is dissolved in 10 cc. of dimethyl formamide and flushed into the filtrate. After standing it room temperature for 48 hours, the product is precipitated by the addition of ether, and the supernatant solution is decanted. The precipitate is dissolved in a small amount of methanol and reduced to a powder by a further addition of ether. After filtering with suction and drying, 180 mg. of the protected crude dotriacontapeptide are dissolved in 4 cc. of a mixture of methylene chloride/trifluoroacetic acid/water. The solution is allowed to stand at room temperature for 1 hour, whereupon it is completely concentrated by evaporation. The residue is taken up in 0.2 N acetic acid and absorbed on a biogel column $P_6$ (1 x 300 cm.). Elution is effected with 0.2 N acetic acid. The combined pure fractions are concentrated by evaporation and subsequently lyophilized. The title compound, having a M.P. of 210° (decomp.), $[\alpha]_D^{20}=-18°$ in 50% acetic acid, is obtained.

Composition of amino acids after acid hydrolysis (6 N, 16 hours): Asp 3.2; Thr 3.9; Ser 2.7; Gln 2.0; Pro 2.0; Gly 3.0; Ala 1.0; Cys 1.6; Val 2.0; Leu 5.0; Phe 1.0; His 1.0; Lys 2.0; Arg 1.0.

What is claimed is:
1. A compound of the formula:

H-Cys-Ser-Asn-Leu-Ser-Thr-Cys-Val-Leu-Gly-Lys-Leu-Ser-Gln-Asp-Leu-His-Lys-Leu-Gln-Thr-Phe-Pro-Arg-Thr-Asn-Thr-Gly-X-Gly-Y-Pro-NH$_2$ wherein:
X is valyl and
Y is alanyl, or
X is alanyl and
Y is valyl, or a pharmaceutically acceptable acid addition salt or metal complex thereof and all of the amino acids except glycine are in the L-configuration.

2. The compound of claim 1, which is

H-Cys-Ser-Asn-Leu-Ser-Thr-Cys-Val-Leu-Gly-Lys-Leu-Ser-Gln-Asp-Leu-His-Lys-Leu-Gln-Thr-Phe-Pro-Arg-Thr-Asn-Thr-Gly-Val-Gly-Ala-Pro-NH$_2$ wherein all of the amino acids except gycine are in the the L-configuration.

3. The compound of claim 1, which is

H-Cys-Ser-Asn-Leu-Ser-Thr-Cys-Val-Leu-Gly-Lys-Leu-Ser-Gln-Asp-Leu-His-Lys-Leu-Gln-Thr-Phe-Pro-Arg-Thr-Asn-Thr-Gly-Ala-Gly-Val-Pro-NH$_2$ wherein all of the amino acids except glycine are in the L-configuration.

References Cited

Guttmann et al.: Calcitonin 1969, Proceedings of the 2d Internat'l Symp., London, July 21, 1969, Heinemann Med. Books, London (1970), pp. 74–79. Effective date under 35 U.S.C. 102: August 1969.

Potts et al.: Calcitonin 1969, Proc. of the 2d Internat'l Symp., London, July 21, 1969, Heinemann Med. Books, London (1970), pp. 70–72. Effective date under 35 U.S.C. 102: Aug. 1969.

ELBERT L. ROBERTS, Primary Examiner

R. J. SUYAT, Assistant Examiner

U.S. Cl. X.R.

424—177; 260—112.5 T